United States Patent
Mödinger et al.

(10) Patent No.: US 11,628,802 B2
(45) Date of Patent: Apr. 18, 2023

(54) SUBASSEMBLY FORMED OF A SEAT BELT RETRACTOR BELT REEL AND A DRIVE WHEEL

(71) Applicant: ZF Automotive Germany GmbH, Alfdorf (DE)

(72) Inventors: Thomas Mödinger, Alfdorf (DE); Milos Cekic, Waiblingen (DE); Andreas Pregitzer, Ellenberg (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 389 days.

(21) Appl. No.: 16/755,389

(22) PCT Filed: Oct. 12, 2018

(86) PCT No.: PCT/EP2018/077825
§ 371 (c)(1),
(2) Date: Apr. 10, 2020

(87) PCT Pub. No.: WO2019/073022
PCT Pub. Date: Apr. 18, 2019

(65) Prior Publication Data
US 2021/0206341 A1   Jul. 8, 2021

(30) Foreign Application Priority Data
Oct. 13, 2017  (DE) .......................... 102017123855.7

(51) Int. Cl.
*B60R 22/46*   (2006.01)

(52) U.S. Cl.
CPC ........ *B60R 22/46* (2013.01); *B60R 2022/468* (2013.01)

(58) Field of Classification Search
CPC .......................... B60R 22/46; B60R 2022/468
See application file for complete search history.

(56) References Cited

U.S. PATENT DOCUMENTS

| | | | |
|---|---|---|---|
| 4,423,846 A * | 1/1984 | Fohl | B60R 22/4619 280/806 |
| 4,597,544 A | 7/1986 | Fohl | |
| 5,743,480 A * | 4/1998 | Kopetzky | B60R 22/4628 242/374 |
| 5,906,328 A * | 5/1999 | Hamaue | F16D 41/064 242/374 |

(Continued)

FOREIGN PATENT DOCUMENTS

| | | |
|---|---|---|
| DE | 102007020000 A1 | 11/2008 |
| DE | 102010054845 A1 | 3/2013 |
| EP | 2476591 A1 | 7/2012 |

(Continued)

*Primary Examiner* — Sang K Kim
(74) *Attorney, Agent, or Firm* — Tarolli, Sundheim, Covell & Tummino LLP

(57) ABSTRACT

A subassembly includes a belt reel for a seat belt retractor and a drive wheel on which a belt tensioner can act to drive the belt reel in a winding direction of the seat belt, wherein between the drive wheel and the belt reel there is provided an overload clutch which includes plural shear elements, especially shear pins, each of which is inserted in an opening of the belt reel and/or of the drive wheel, the opening extending in the axial direction starting from a front side of the belt reel.

13 Claims, 5 Drawing Sheets

(56) References Cited

U.S. PATENT DOCUMENTS 7,850,112 B2 * 12/2010 Braun .................... B60R 22/46
                                                                         280/805
8,662,435 B2 * 3/2014 Maekubo ............ B60R 22/3413
                                                                         242/374

FOREIGN PATENT DOCUMENTS

| JP | 2004237841 A | 8/2004 |
| --- | --- | --- |
| WO | 0026554 A1 | 5/2000 |
| WO | 2010031541 A1 | 3/2010 |

\* cited by examiner

SUBASSEMBLY FORMED OF A SEAT BELT RETRACTOR BELT REEL AND A DRIVE WHEEL

CROSS-REFERENCE TO RELATED APPLICATION

This application is a national stage of International Application No. PCT/EP2018/077825, filed Oct. 12, 2018, the disclosure of which is incorporated herein by reference in its entirety, and which claimed priority to German Patent Application No. 102017123855.7, filed Oct. 13, 2017, the disclosure of which is incorporated herein by reference in its entirety.

TECHNICAL FIELD

The invention relates to a subassembly formed of a belt reel for a seat belt retractor and a drive wheel on which a belt tensioner can act to drive the belt reel in a winding direction of the seat belt.

BACKGROUND

The subassembly is part of a seat belt retractor which serves for providing a seat belt for a vehicle occupant of an automotive vehicle, for example. For this purpose, the belt reel is rotatable so that, against the force of a winding spring, the seat belt can be extended so as to fasten the same. When the vehicle occupant unfastens the seat belt again, the winding spring rotates the belt reel in the winding direction so that the seat belt is wound up again.

The belt tensioner serves for driving the belt reel in the winding direction, in the case of need, to eliminate the so-called belt slack, viz. to pull the seat belt tight so that the vehicle occupant is involved in the deceleration of the automotive vehicle as early as possible.

Various embodiments of belt tensioners are known. All of them have in common the fact that they can apply a comparatively high torque to the belt reel to tighten the seat belt with high force. Depending on the embodiment, said force may be in the range of up to about 3.5 kN.

The belt tensioners are configured to reach the desired webbing forces even when a particular length of the seat belt has to be retracted for this purpose, for example when the vehicle occupant wears voluminous clothes. This capability of the belt tensioner results in the fact that very high forces can act, if the belt reel cannot be rotated or can be rotated only very slightly after activating the belt tensioner.

SUMMARY

It is the object of the invention to limit the maximum forces acting in such condition. For achieving this object, in a subassembly of the type mentioned in the beginning between the drive wheel and the belt reel an overload clutch is provided which includes plural shear elements, especially shear pins, each of which is inserted in an opening of the belt reel and/or of the drive wheel, the opening extending starting from a front side of the belt reel in the axial direction. Put simply, the invention is based on the basic idea to provide a predetermined breaking point between the drive wheel on which the belt tensioner acts and the belt reel. Said predetermined breaking point ensures the drive wheel to detach from the belt reel and to be capable of rotating substantially freely, if the belt tensioner is activated while the belt reel is blocked and an excessively high torque acts on the drive wheel. This prevents excessively high pressures from building up in a pyrotechnic belt tensioner, for example. By arranging the shear elements on a front side of the belt reel, a high transmissible torque, while the dimensions of the shear elements are small, and a compact design are resulting. Preferably, the shear elements extend in the axial direction. This is beneficial to easy mounting of the subassembly.

According to one embodiment of the invention, each shear element is provided to be formed integrally, for example cast in one piece, either with the drive wheel or with the belt reel. This reduces the assembly cost.

According to another embodiment of the invention, each shear element is provided to be inserted in an opening of the drive wheel or of the belt reel which extends in the axial direction starting from a front side of the drive wheel. The openings may be introduced when the drive wheel or the belt reel is manufactured, for example when the drive wheel or the belt reel is cast.

Alternatively, it is possible that each shear element is inserted in a bore of the drive wheel that extends in the axial direction starting from a front side of the drive wheel. The bores can be manufactured after manufacturing the drive wheel.

It is basically imaginable that the amount of the transmissible torque is adjusted by providing a different number of openings or bores with shear elements. In this way, the subassembly can be adapted to different requirements without any constructional modifications being necessary. When the shear elements are exposed on the side of the drive wheel remote from the belt reel, they can be inserted into the openings or bores from the side remote from the belt reel.

According to an alternative embodiment, each shear element is provided to be located in a recess of the drive wheel which extends in the radial direction starting from a peripheral surface of the drive wheel. These "pockets" in which the shear elements are located can allow certain rotation of the drive wheel relative to the belt reel, for example when a damping element is provided between the belt reel and the drive wheel. The number of shear elements is selected so that an optimum compromise is achieved among small dimensions of the individual shear element, space required for accommodating all shear elements and reproducibility of the torque in which the shear elements are responsive. From 6 to 14 shear elements have turned out to be especially suited. However, also 2 to 5 preferably symmetrically arranged shear elements are possible. In order to facilitate mounting of the drive wheel to the belt reel, the belt reel may be provided with a guiding extension on which the drive wheel is disposed. The guiding extension ensures the drive wheel to be optimally centered relative to the belt reel.

Between the guiding extension and the drive wheel a positioning design may be provided which guarantees "correct" angular assignment between the drive wheel and the belt reel, i.e. the shear elements may be provided to be mounted in or inserted into the dedicated bores/openings. Said positioning design is not capable of transmitting a noticeable torque between the guiding extension and the drive wheel, however the torque of the belt tensioner is transmitted (almost) exclusively via the shear elements.

BRIEF DESCRIPTION OF THE DRAWINGS

In the following, the invention shall be described by way of different embodiments shown in the attached drawings, wherein.

DETAILED DESCRIPTION

Figure 1:
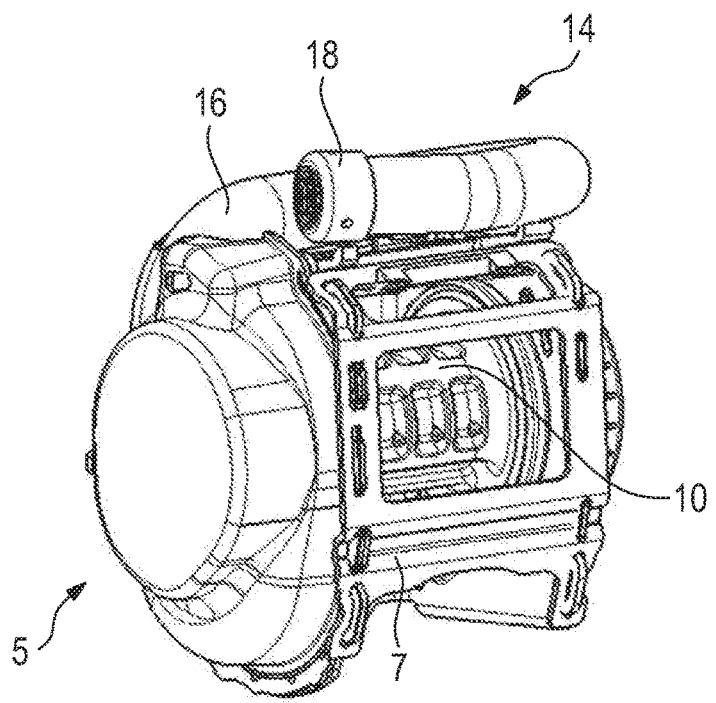
FIG. 1 shows a belt retractor including a belt tensioner in a perspective view.
Figure 2:
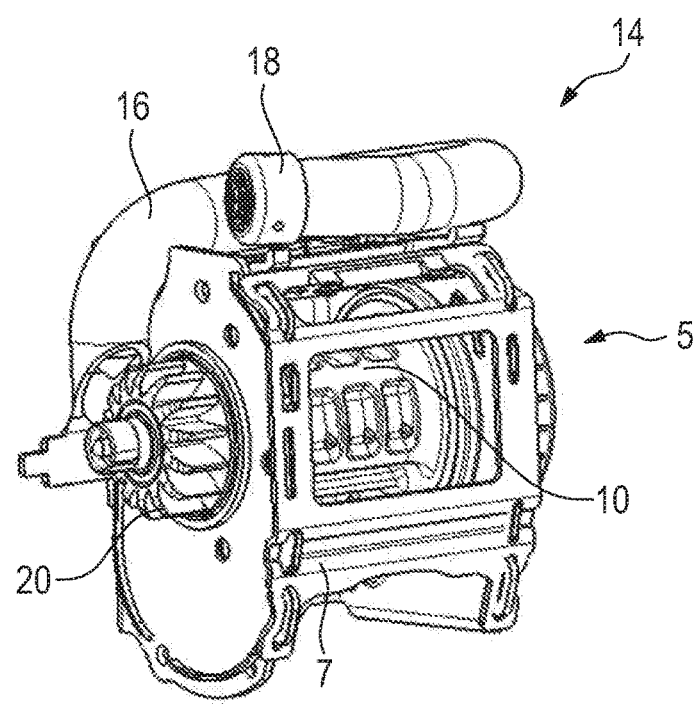
FIG. 2 shows the belt retractor of FIG. 1 with the belt tensioner being partly removed.
Figure 3:
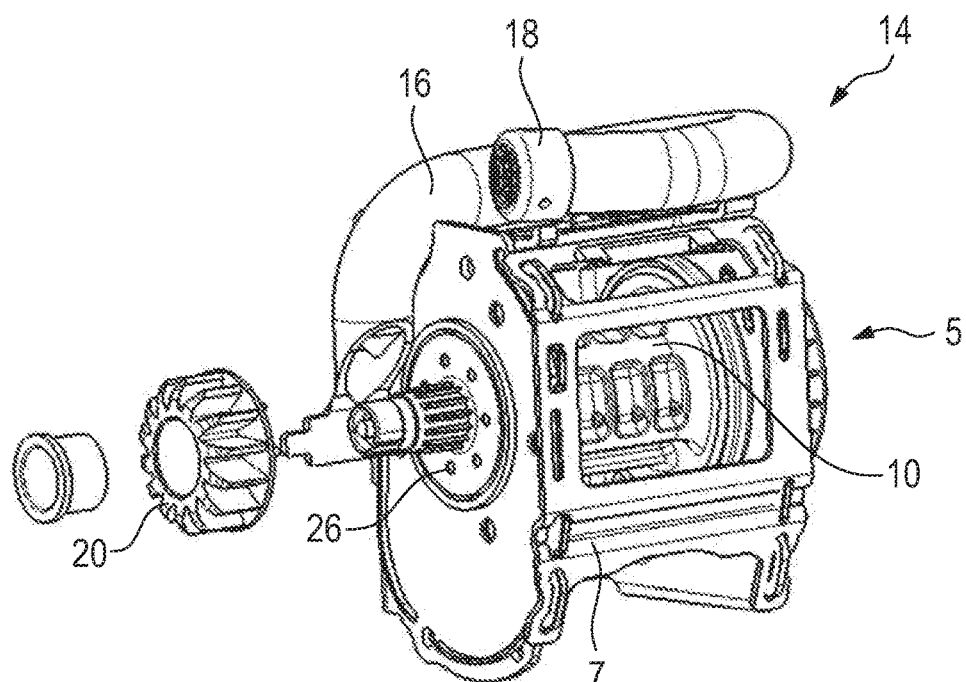
FIG. 3 shows the belt retractor of FIG. 2 with the drive wheel being detached.
Figure 4:
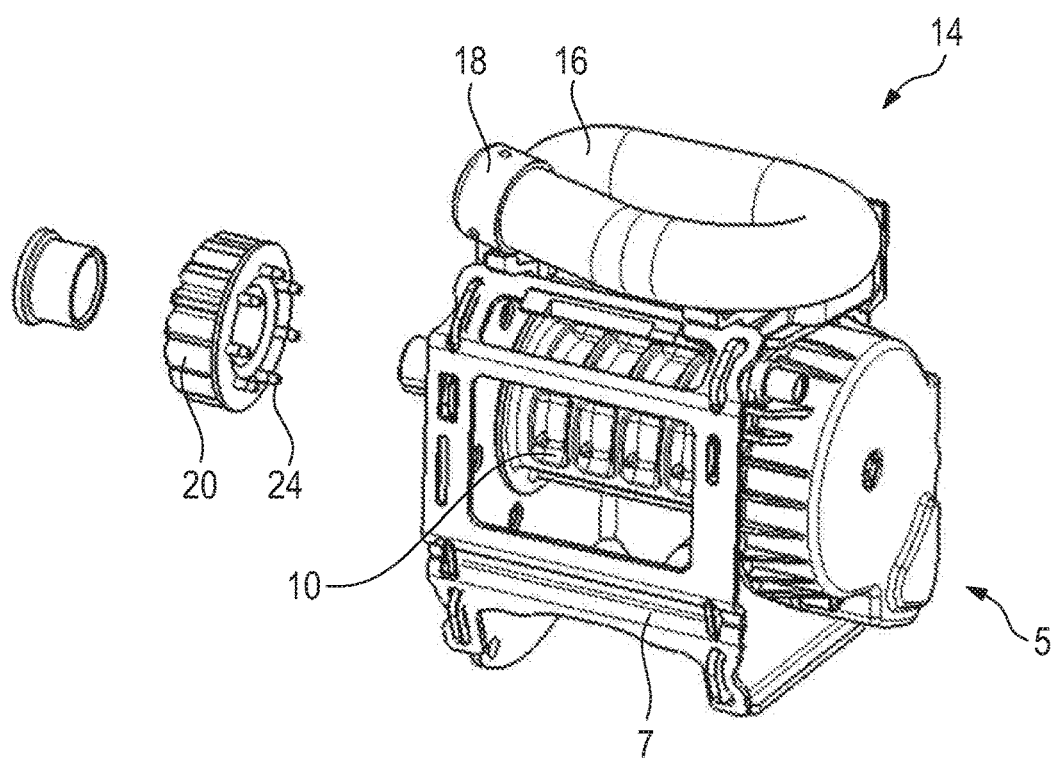
FIG. 4 shows the belt retractor of FIG. 3 in a different perspective view.
Figure 5:
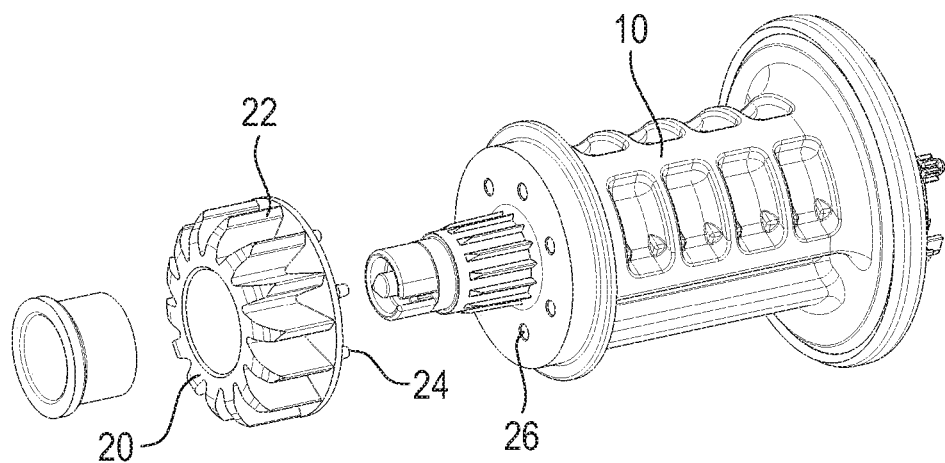
FIG. 5 shows a subassembly according to a first embodiment of the invention in an enlarged perspective view.

From the FIGS. 1 to 5, a belt retractor 5 including a frame 7 in which a belt reel 12 is rotatably arranged is evident. A seat belt which is adapted to restrain a vehicle occupant in the case of need can be received on the belt reel. Component parts such as a locking mechanism or a retractor spring are not shown here, as they are not relevant to the comprehension of the invention.

A belt tensioner 14 which, in the illustrated example, has a pressure tube 16 in which a plastic rod (not visible here) is accommodated is provided on the belt retractor 5. Said plastic rod is moved out of the pressure tube 16, when a schematically indicated gas generator 18 is activated, so that it engages in and catches a drive wheel 20. The drive wheel 20 is connected to the belt reel 10 in a rotationally fixed manner. This helps pressurize the belt reel 10 in the winding direction, when the belt tensioner is activated. The drive wheel 20 includes, on its outside, a plurality of blades 22 which ensure a friction and form fit with the plastic rod. For connecting the drive wheel 20 to the belt reel 10, a plurality of shear elements 24 are provided which are arranged at the drive wheel 20 and engage in corresponding openings 26 provided in the belt reel 10.

In the first embodiment illustrated in the FIGS. 1 through 5, the shear elements 24 are formed integrally, especially cast jointly, with the drive wheel 20. They take the shape of circular journals. The shear elements 24 extend in the axial direction from a front side of the drive wheel 20 facing the belt reel 10. Accordingly, the openings 26 are located on a front side of the belt reel 10 facing the drive wheel 20. The front side of the belt reel 10 provided with the openings 26 defines a plane normal to the longitudinal axis of the belt reel 10.

The belt reel 10 is provided with a guiding extension 28 on which the drive wheel 20 is accommodated. In order to ensure, when the drive wheel 20 is mounted, the shear elements 24 to be guided into the openings 26, appropriate positioning designs may be provided between the guiding extension 28 and the inner face of the drive wheel 20. The shear elements 24 are dimensioned so that they can transmit a torque that is sufficient for the desired belt tensioning to the belt reel 10. If said torque is exceeded, the shear elements 24 will shear off so that no further torque is transmitted to the belt reel 10.

Figure 6:
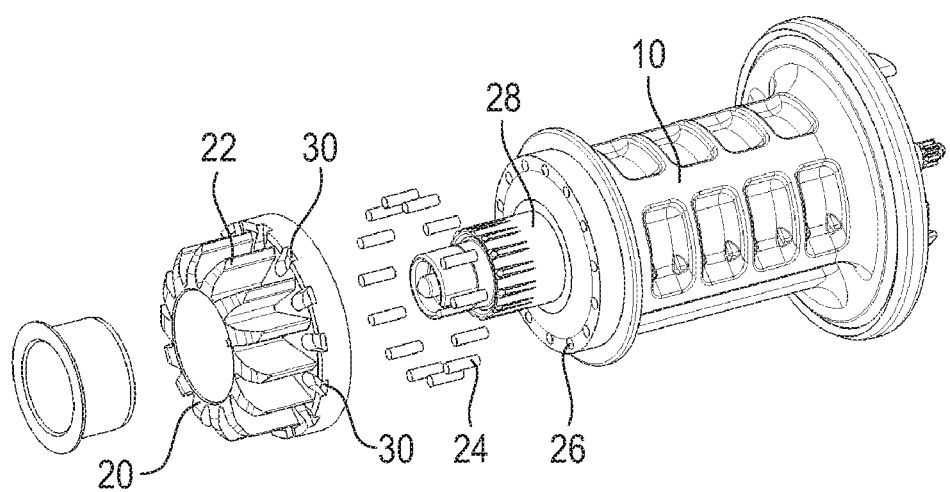
FIG. 6 shows a subassembly according to a second embodiment of the invention in a view corresponding to that of FIG. 5.

FIG. 6 illustrates a second embodiment. For the component parts known from the first embodiment the same reference numerals are used and, in this respect, the foregoing explanations are referred to. The difference between the first and second embodiments consists in the fact that, in the second embodiment, the shear elements 24 are formed by shear pins which are formed separately from the drive wheel 20 (and also from the belt reel 10). For receiving the shear elements 24, plural continuous pocket-type openings 30 which are arranged in an annular shoulder of the drive wheel 20 and are open on the side of the blades 22 are provided in the drive wheel 20. Thus, the shear elements 24 can be mounted after the drive wheel 20 has been attached to the belt reel 10.

Figure 7:
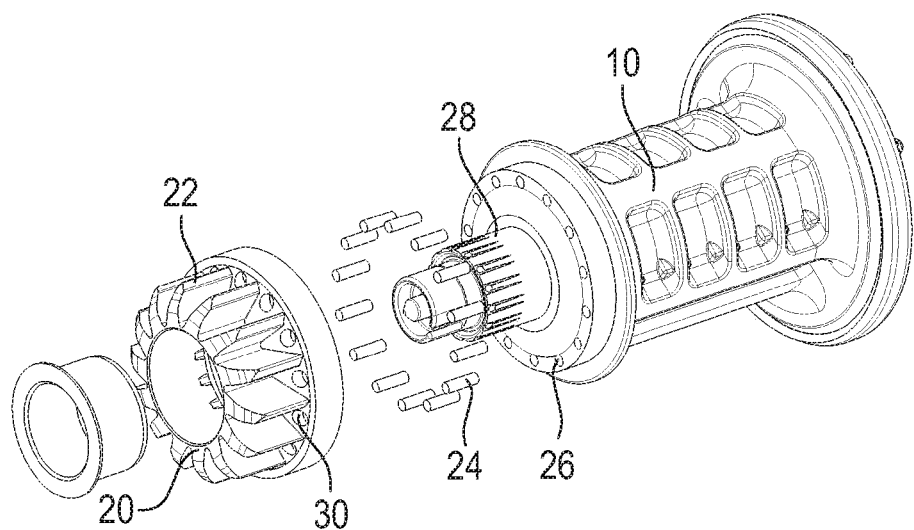
FIG. 7 shows a subassembly according to a third embodiment of the invention in a view corresponding to that of FIG. 5.

FIG. 7 illustrates a third embodiment. For the component parts known from the second embodiment, the same reference numerals are used, and, in this respect, the foregoing explanations are referred to. The difference between the second and third embodiments consists in the fact that in the third embodiment the openings 30 are in the form of bores within the drive wheel 20.

Figure 8:
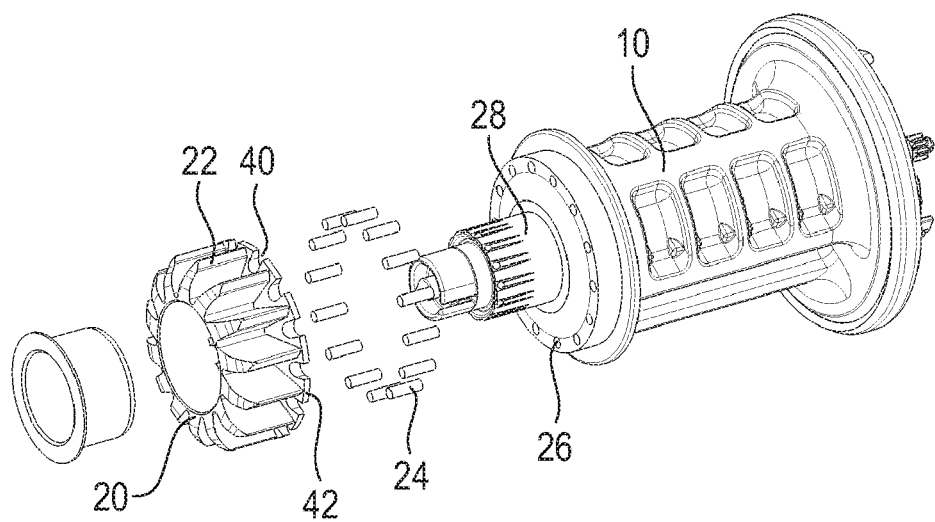
FIG. 8 shows a subassembly according to a fourth embodiment of the invention in a view corresponding to that of FIG. 5.
Figure 9:
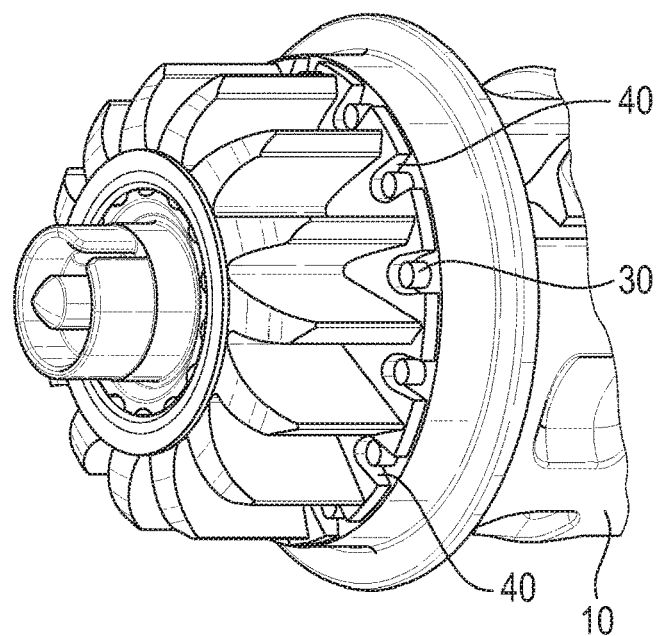
FIG. 9 shows an axial end of the subassembly according to the fourth embodiment of the invention in a perspective view.
Figure 10:
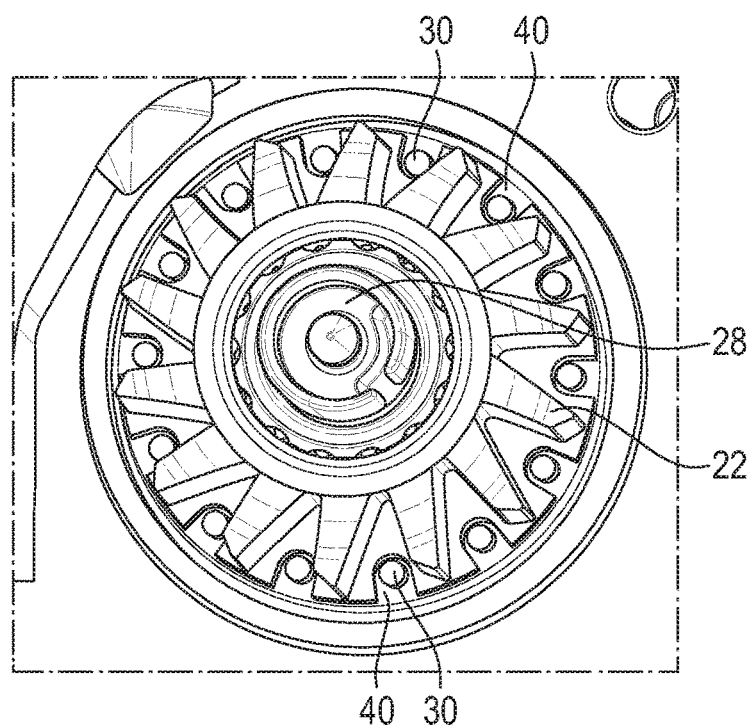
FIG. 10 shows a top view onto the end of the subassembly shown in FIG. 9 according to the fourth embodiment.

In the FIGS. 8 to 10, a fourth embodiment is illustrated. For the component parts known from the second and third embodiments, the same reference numerals are used, and, in this respect, the foregoing explanations are referred to. The difference between the fourth embodiment and the second and third embodiments consists in the fact that in the fourth embodiment the shear elements are arranged in pockets 40 provided in a flange 42 of the drive wheel 20. The pockets extend inwardly in the radial direction starting from the outer periphery of the flange 42.

As is evident especially from FIGS. 9 and 10, in the peripheral direction the pockets have a dimension that is slightly larger than the diameter of the shear elements 24.

The invention claimed is:

1. A subassembly comprising:
a belt reel for a seat belt retractor; and
a drive wheel on which a belt tensioner can act to drive the belt reel in a winding direction of the seat belt,
wherein between the drive wheel and the belt reel there is provided an overload clutch which includes plural shear elements, the shear elements being configured to shear off to prevent the belt tensioner from driving the belt reel in the winding direction, each of the shear elements being inserted in an opening of the belt reel and/or of the drive wheel, the opening extending in the axial direction starting from a front side of the belt reel.

2. The subassembly according to claim 1, wherein the shear elements extend in the axial direction.

3. The subassembly according to claim 1, wherein each shear element is formed integrally with the drive wheel.

4. The subassembly according to claim 1, wherein each shear element is inserted in an opening of the drive wheel which extends in the axial direction starting from a front side of the drive wheel.

5. The subassembly according to claim 4, wherein the shear elements are exposed on the side of the drive wheel remote from the belt reel.

6. The subassembly according to claim 1, wherein each shear element is inserted in a bore of the drive wheel which extends in the axial direction starting from a front side of the drive wheel.

7. The subassembly according to claim 1, wherein each shear element is located in a recess of the drive wheel which extends in the radial direction starting from a peripheral surface of the drive wheel.

8. The subassembly according to claim 1, wherein the number of the shear elements ranges from 6 to 14.

9. The subassembly according to claim 1, wherein the belt reel is provided with a guiding extension on which the drive wheel is disposed.

10. The subassembly according to claim 9, wherein the guiding extension and the drive wheel are configured to prevent torque from transferring between the guiding extension and the drive wheel.

11. The subassembly according to claim 1, wherein the shear elements are shear pins.

12. The subassembly according to claim 1, further comprising a belt tensioner for applying a force to the belt reel that drives the belt reel in the winding direction, the belt tensioner applying the force to the belt reel through the drive wheel, the shear elements being configured to shear off to prevent the belt tensioner from applying the force to the belt reel.

13. The subassembly according to claim 12, wherein the shear elements are configured to permit the belt tensioner to apply a predetermined amount of force to the belt reel, the shear elements being configured to shear off when the force provided by the belt tensioner exceeds a predetermined force limit so as to prevent the belt tensioner from further applying force to the belt reel.

* * * * *